US008157498B2

(12) United States Patent
Stolzer et al.

(10) Patent No.: US 8,157,498 B2
(45) Date of Patent: Apr. 17, 2012

(54) STORAGE RACKS

(75) Inventors: Armin Stolzer, Nierstein (DE);
Bernhard Huber, Kappelrodeck (DE)

(73) Assignee: KEURO Besitz GmbH & Co. EDV-Dienstleistungs KG, Achern (DE)

( * ) Notice: Subject to any disclaimer, the term of this patent is extended or adjusted under 35 U.S.C. 154(b) by 322 days.

(21) Appl. No.: 12/340,908

(22) Filed: Dec. 22, 2008

(65) Prior Publication Data
US 2010/0012608 A1   Jan. 21, 2010

(30) Foreign Application Priority Data
Jul. 17, 2008   (DE) .......................... 20 2008 009 631

(51) Int. Cl.
*B65G 1/10*   (2006.01)

(52) U.S. Cl. ......... 414/279; 414/277; 414/284; 414/286
(58) Field of Classification Search .................. 414/279, 414/140.4, 222.1, 286, 277, 284
See application file for complete search history.

(56) References Cited

U.S. PATENT DOCUMENTS

| | | | |
|---|---|---|---|
| 3,880,299 A * | 4/1975 | Zollinger et al. ............. | 414/273 |
| 5,328,038 A * | 7/1994 | Allen ............................ | 211/151 |
| 5,393,188 A * | 2/1995 | Scott et al. .................... | 414/276 |
| 6,851,562 B2 * | 2/2005 | Gorniak et al. .............. | 211/59.2 |

FOREIGN PATENT DOCUMENTS

| | | |
|---|---|---|
| DE | 3440456 | 5/1986 |
| DE | 202006016309 | 1/2007 |
| EP | 0116152 | 8/1984 |
| EP | 0281955 | 5/1991 |

* cited by examiner

*Primary Examiner* — Scott Lowe
(74) *Attorney, Agent, or Firm* — Volpe and Koenig, P.C.

(57) ABSTRACT

A storage rack having a shelf with storage spaces, arranged over top of each other, for pallets that are horizontally removed sideways. A rack operating device moves the pallets from the spaces, and a station cart forms a lowermost space for a pallet, and can be horizontally moved from the rack on first rails. An upper cart is located above the station cart and forms another one of the spaces to receive a pallet and is horizontally movable on second rails that have a wider track than the first rails and also lead out of the rack. The upper cart has a greater clearance in an area of the station cart which is larger than a length of the pallet, and runs on the second rails, and parts of the upper cart not related to the support structure thereof can be inserted between the vertical rack supports of the rack.

9 Claims, 5 Drawing Sheets

STORAGE RACKS

CROSS-REFERENCE TO RELATED APPLICATIONS

This application claims the benefit of DE 20 2008 009 631.6, filed Jul. 17, 2008, which is incorporated by reference herein as if fully set forth.

BACKGROUND

The invention relates to a storage rack having at least one shelf with a number of storage spaces for pallets arranged over top of each other, which are held in the storage spaces by vertical rack supports arranged at the face, and which can be horizontally removed from the storage spaces from the side. In order to remove the pallets from the storage spaces of the rack as well as for storing pallets in the storage spaces of the rack, a rack operating device is provided, which is arranged at the longitudinal side of the rack and which can approach each storage space.

Stored on the pallets of a generic storage rack are particularly sheet metal, circuit boards, and poles made from metal in order to provide material for steel wholesale in a sorted fashion and to remove it for commissioning purposes, supply it to a processing station (for example a machine saw or a sheet metal processing machine), and to store the remaining pieces of the material and/or the processed material back in the storage rack. For this purpose the rack operating device approaches the storage space in which the pallet with the requested material is being stored, removes said pallet via a manipulator arranged on the rack operating device laterally from said storage space, and moves the pallet to the lowermost storage space of the rack formed by a station cart. The rack operating device transfers the respective pallet to the station cart. The station cart itself can be moved horizontally out of the rack on a pair or rails, with the pair of rails leading out of the rack at the side of the lowermost storage space facing away from the rack operating device; when the rack operating device is arranged behind the rack the station cart can therefore drive out of it on its rails at the front of the rack.

The pallet that has left the rack on the station cart or the material located on said pallet is then usually fed in a transfer station to a processing machine, for example a desired piece is cut off the material, and the remaining piece of the material and/or the processed material is once more placed onto the station cart and/or onto the pallet located thereupon, and then the station cart is moved back to the rack and assumes the lowermost storage space. From here the rack operating device can remove the pallet again, bring it to the original or a different storage space allocated by a rack storage control, and store it there.

When sheet metal is stored in storage racks of the present type, fed via the station cart to sheet metal processing machines, such as flat bed—laser machines, it has proven advantageous to provide an upper cart as a second station cart in addition to the just described station cart. This upper cart has the same properties as the station cart, in principle, with it being arranged above the station cart in the rack and here also assuming a storage space. The station cart and the upper cart can be moved out of the rack and returned back into the rack independently in reference to each other, with one of the two, usually the station cart, being used as a supply cart to provide the material while the other cart, usually the upper cart, serves as the return cart to place the processed material back in the rack.

The presence of two independently operating carts in a storage rack of the present type causes some problems, though. In order to optimally utilize the given space the vertical rack supports forming the rack frame are distanced from each other only to such an extent that the pallets can just be horizontally moved sideways between the rack supports; the distance between the rack supports each arranged at the face is therefore equivalent to the length of the stored pallets plus a certain clearance to allow removing the pallets between the rack supports sideways out of the rack and/or to insert them therein. Due to the fact that the station cart removes entire pallets, also sideways out of the rack, it requires clear space on the rails along its entire traveling distance equivalent in its width approximately to the distance between the rack supports. Therefore, the upper cart cannot simply be moved on a second pair of rails similar to the station cart extending at the same height as the first pair of rails of the station cart, because the second pair of rails also had to extend into the rack and thus had to have a distance between the two rails smaller than the distance of the rail supports and thus also smaller than the extension of the pallets transported on the station cart. Supports of the upper cart by which it can be moved on the second pair of rails would therefore interfere with the station cart and hinder the station cart and the upper cart to be moved entirely independently from each other between the rack and the processing and/or commissioning station.

One approach to avoid this problem is to move the second pair of rails above the station cart, thus to elevate it. However, here any crossing of the traveling path of the upper cart is no longer possible; furthermore elevated rails form a disturbing edge for automatic supply installations, removing the material from the upper cart and particularly the station cart and feeding them to the processing station.

Another approach to avoid the described problem comprises arranging the rack supports further apart than usual so that the second pair of rails can be guided into the rack over a rail width larger than the length of the pallets. The upper cart can then be guided along rails arranged at the same height as the first pair of rails without the supports necessary here interfering the traveling path of the station cart. However, here it is not only required for the rack to be wider than actually necessary but additionally it is necessary to provide additional spacing elements at the rack supports in the area of the normal storage spaces, i.e. except for the storage spaces formed by the station cart and the upper cart, to allow holding the pallets; then the pallets cannot be held directly at the rack supports. In addition to increased space necessary this also results in increased material expenses; furthermore, when using this approach an existing storage rack cannot be retrofitted with an upper cart.

SUMMARY

The present invention is directed to an improved solution to avoid the problems described.

This is attained in a storage rack having the features of the invention. Preferred further embodiments of the storage rack according to the invention are described below.

The approach suggested in the present invention begins with the upper cart and leaves the rack unchanged for the rest, here allowing the second pair of rails, on which the upper cart can be moved, having to be of a wider track than the first pair of rails, however arranged essentially at the same height in reference thereto, which can lead into the rack, thus showing a track smaller than the length of the pallets. Therefore, the advantages of both solutions of prior art mentioned at the outset are combined without having to accept any of the respective disadvantages.

The modification of the upper cart according to the invention comprises that it is provided with a support structure at the side facing away from the rack operating device, which has a horizontally clear width greater than a length of the pallets at least in the area of the station cart, while it is provided with wheels running on the second pair of rails. This support structure cannot be inserted into the rack between the rack supports in the area of the station cart due to the just mentioned clear width because the rack supports are distanced only slightly farther apart than the length of the pallets; this however only applies to the support structure of the upper cart, while the parts of the upper cart not related to the support structure and serving to receive the pallets are embodied narrower according to the invention, so that they can be inserted between the vertical rack supports of the rack. In the state inserted into the rack the upper cart according to the invention is therefore not completely located inside the base of the rack because its support structure has to remain in front of the rack supports. However, its function is not interfered thereby at all, because the parts of the upper cart receiving a pallet once more form a complete storage space of the rack.

The support structure of the upper cart is preferably embodied as a portal-shaped frame with a perpendicular traverse and two supports, with wheels at the ends of the supports for guiding the upper cart arranged on the second pair of rails. Preferably the wheels are arranged at the support ends pulled inwardly in reference to the clear width of the supports in order to compensate the difference between the clear width between the supports, which has to be at least equivalent to the length of the pallets, and the rail width of the second pair of rails, which is smaller than the length of the pallets. It is also possible and within the scope of the present invention that the supports extend not vertically straight but are curved for example such that the station cart with the pallet supported thereupon can be moved between the supports.

An embodiment of the support structure of the upper cart is particularly preferred, in which the support ends are provided with lower cantilevers, each extending parallel in reference to the rails of the second pair of rails. These cantilevers can engage under a part or perhaps also the entire width of a pallet resting on the upper cart, and thus create the necessary stability of the upper cart against tipping under load. This way, any supporting measures of those parts of the upper cart that can be inserted into the rack and receive the pallets are unnecessary. The wheels by which the upper cart runs on the second pair of rails are beneficially arranged distributed over these lower cantilevers.

The parts of the upper cart not related to the support structure can in turn comprise two or more upper cantilevers that can be inserted between the vertical supports of the rack. This saves weight and simplifies the construction; the support areas for the pallets may also be embodied differently, though.

The two pairs of rails to guide the station cart and the upper cart are preferably mounted at the floor of the rack site, which facilitates any crossing thereof and minimizes the structural design. An elevated arrangement of the pair of rails, preferably close to the floor, is also possible within the scope of the present invention.

Preferably the upper cart embodied according to the invention forms the storage space located immediately above the station cart in order to ensure the smallest-possible dimensions of the two carts. Depending on the application, it may be possible though that one or more standard storage spaces are arranged between the station cart and the upper cart.

The storage spaces are preferably formed between the vertical rack supports such that gliders or holding rails are mounted at the vertical rack supports arranged at the front to receive the end faces of the pallets. The pallets can then be inserted on sliders or rollers by the manipulator of the rack operating device into the holding bars and/or pulled out on them, or be placed via telescopic forks of the rack operating device onto support rails at the rack supports and/or be picked up therefrom in order to remove the pallets from the rack and/or to store them therein.

Beneficially the storage rack according to the invention includes a multitude of facially adjacent shelves, which can be approached by a common rack operating device, perhaps arranged in two rows of racks before and behind the rack operating device. The rack operating device can be approached, if necessary, by a common station cart or an upper cart or, when a higher output capacity is requested, by several common station carts and upper carts.

BRIEF DESCRIPTION OF THE DRAWINGS

An exemplary embodiment for a storage rack according to the invention is described and explained in greater detail using the attached drawings.

Shown are.

DETAILED DESCRIPTION OF THE PREFERRED EMBODIMENTS

Figure 1:
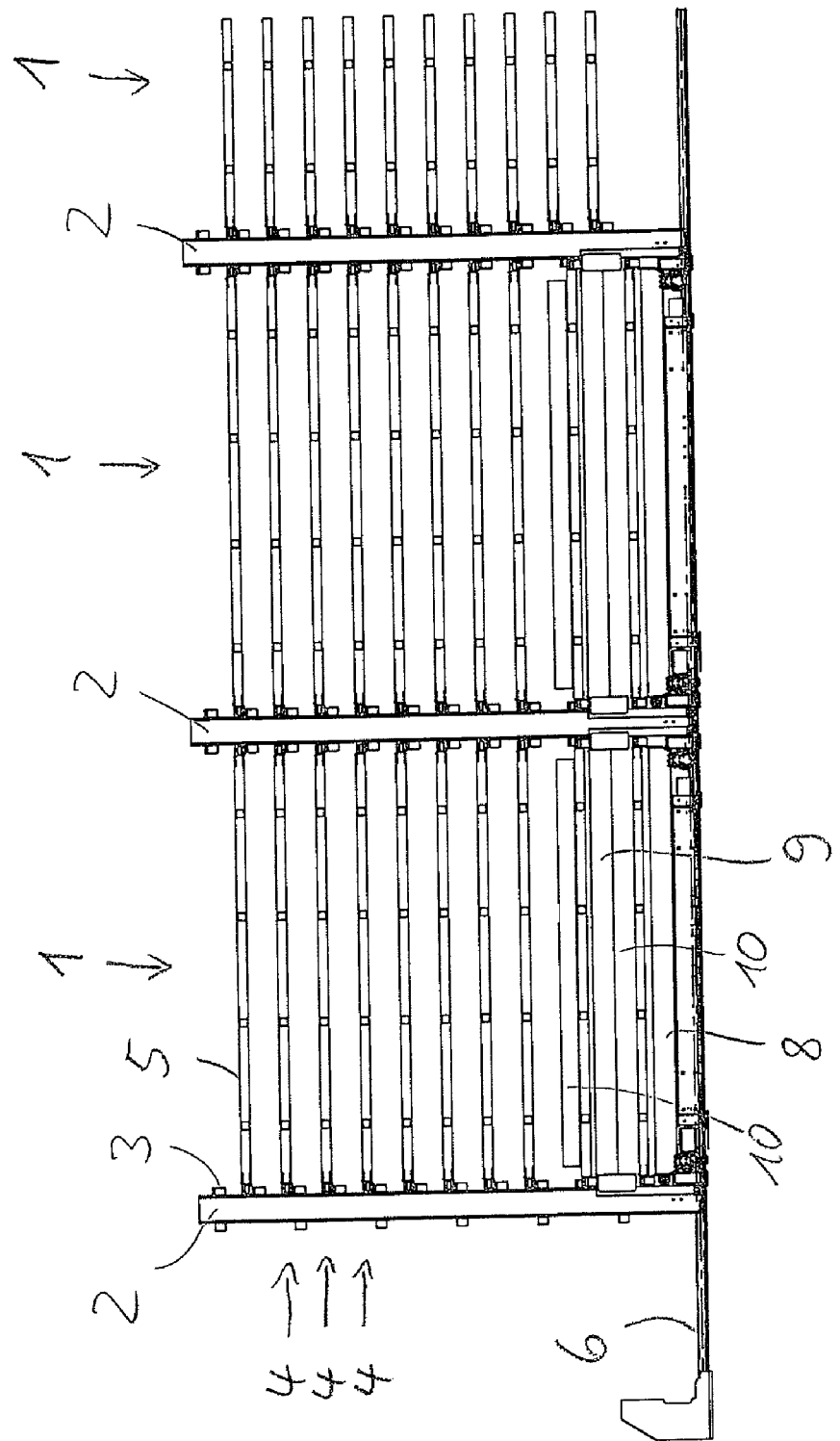
FIG. 1 is a side view of a storage rack embodied according to the invention.

The storage rack (partially) shown in FIG. 1 comprises a number of shelves 1, three shelves 1 thereof are shown here, arranged side-by-side. These shelves 1 are essentially formed by vertical rack supports 2 forming the faces of the rack sections and each of which dividing two side-by-side arranged shelves 1. Horizontally extending sliders 3 or support rails are mounted to the vertical rack supports 2, each of which form a storage space 4, in which the faces of pallets 5 can be inserted. The pallets 5, carrying the stored work pieces (not shown), in turn transfer their weight via the sliders 3 or the support bars to the rack supports 2. They can be horizontally removed sideways from the storage spaces 4, i.e. perpendicular in reference to the drawing plane, which is here performed by a not visible rack operating device 7, displaceable on driving rails 6 not shown in this view behind the shelves 1.

The shelves 1 arranged in FIG. 1 at the left and in the center each have a station cart 8 and an upper cart 9 at their two lowermost storage spaces 4, with here both the station cart 8 as well as the upper cart 9 carrying a pallet, and one circuit board 10 is supported on each of the pallets 5 as the work piece to be processed.

Figure 2:
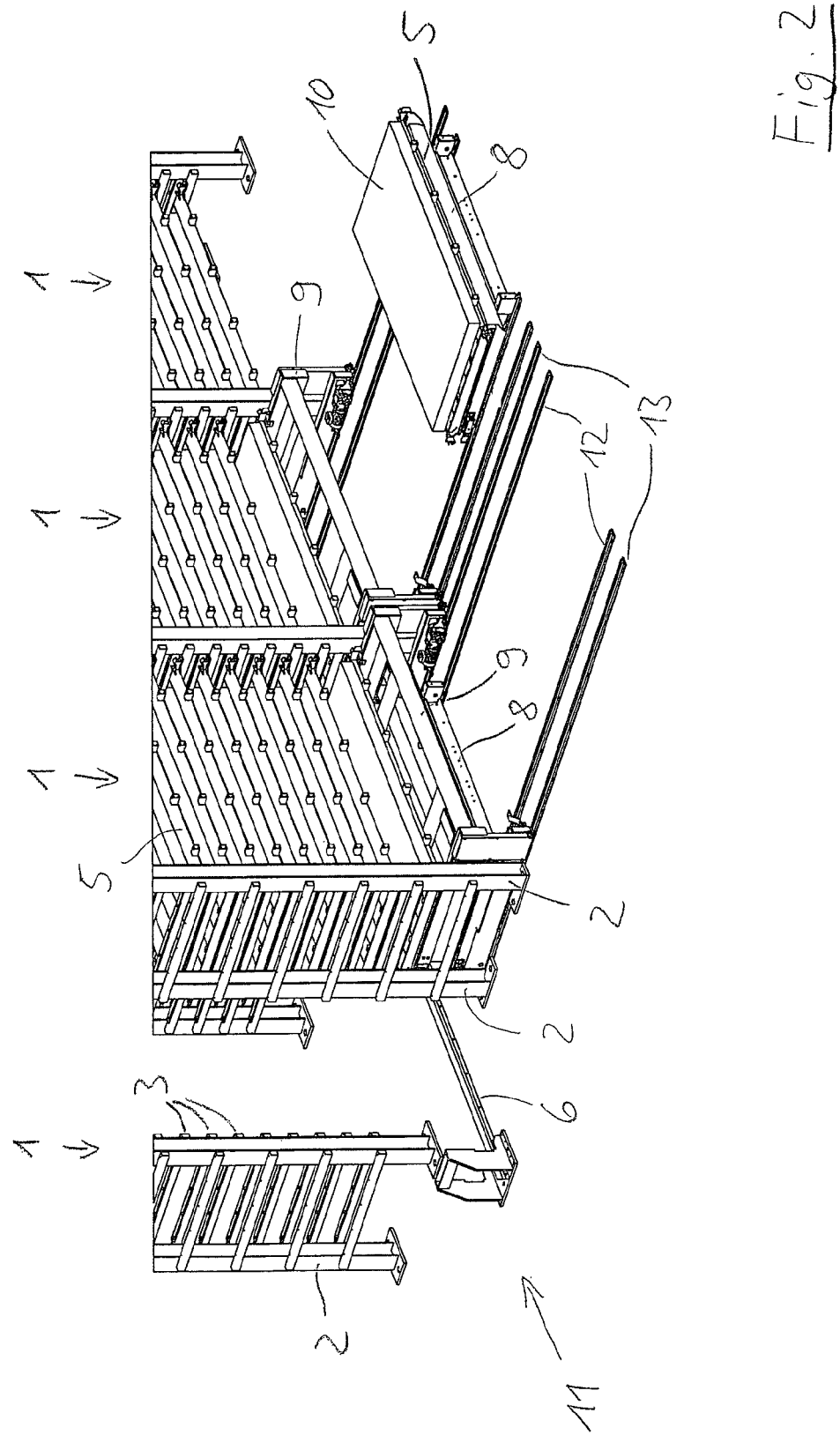
FIG. 2 is a perspective view of the storage rack of FIG. 1, with the station cart moved out.
Figure 3:
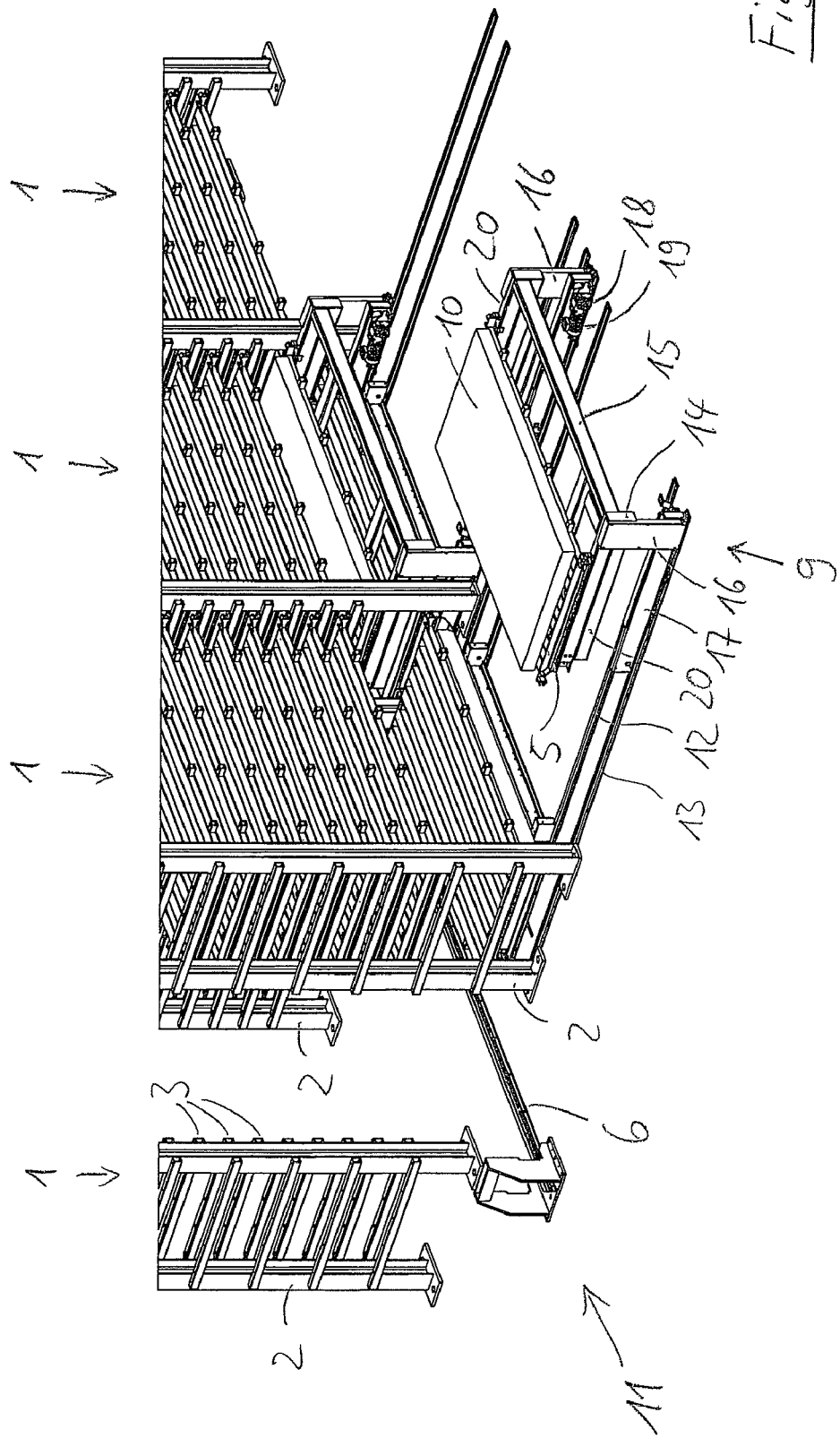
FIG. 3 is a perspective view similar to FIG. 2, however with the upper cart moved out.

FIGS. 2 and 3 show the station cart 8 (FIG. 2) and/or the upper cart 9 (FIG. 3) in a respective perspective view. Based on these figures it is discernible for the rest that the present exemplary embodiment of a storage rack comprises two rows of shelves 1 arranged side-by-side. They form a rack alley 11 between each other, in which the rack operating device 7 is arranged in a manner mobile along its driving rails 6. Furthermore, by the perspective illustration a first pair of rails 12 for the station cart 8 and a second pair of rails 13 for the upper cart 9 are discernible, which are laid along the floor of the storage rack site and which lead out of the rack 1 at the side of said rack 1, facing away from the rack operating device 7 and/or the rack alley 11.

As illustrated in FIG. 2, the station cart 8 is embodied conventionally as a sheet metal cart with a slightly narrower track; it can drive into the lowermost storage space 4 of the rack 1, with a pallet 5 with a circuit board 10 supported on it, and can drive out of it on the first pair of rails 12 towards the front. In the inserted state the pallet 5 can be removed by the track operating device 7 towards the rear into the rack alley 11 and be brought into any arbitrary storage space 4 of the storage rack. Inversely, any arbitrary pallet 5 of the storage rack can be put onto the station cart 8 by the rack operating device 7.

An example of the upper cart 9 embodied according to the invention is shown in greater detail in FIG. 3. It comprises a bend proof and torque-proof portal-shaped frame 14 with a perpendicular traverse 15 and two supports 16, with lower cantilevers 17 being mounted at their ends, pulled inwardly. The lower cantilevers 17 carry wheels 18, which run on the second pair of rails 13 and are driven by motors 19. The support surface of the upper cart 9 for the pallet 5 and the circuit board 10 supported thereupon is here formed by four upper cantilevers 20, however preferably it may also be formed by only two upper cantilevers 20 at the end sections of the pallet 5, with the cantilevers 20 accepting the function of sliders 3 and/or support rails of the rack 1. The upper cantilevers 20 are sized of such a length that the pallet 5 is received entirely in the storage space second to the bottom of the rack 1, in order to allow it to be engaged by the rack operating device 7.

For this purpose, the upper cantilevers 20 are embodied narrower than the portal-shaped frame 14 so that they fit between the vertical rack supports 2, as particularly discernible from FIG. 2. The portal-shaped frame 14 itself is embodied wider, in order not to hinder the traveling path of the station cart 8, and thus it remains outside the rack 1 when the upper cart 9 is inserted into the shelf 1 (FIG. 2.)

It is also clearly discernible from FIG. 3 that the lower cantilevers 17 are embodied having the same length as the upper cantilevers 20 so that the upper cart 9 overall is of high stability and cannot tip towards the rear when a circuit board 10 rests thereupon, without the upper cantilevers 20 requiring additional support at the rear of the upper cart 9. The arrangement of the lower cantilevers 17, spaced inwardly in reference to the supports 16 of the portal-shaped frame 14 of the upper cart 9, allows for the track of the second pair of rails 13 to be selected such that it leads out of the shelf 1 and/or into it, namely between the rack supports 2 arranged at the face. However, sufficient clearance remains for the station cart 8 between the supports 16 of the upper cart 9 in order to move it underneath the upper cart 9 together with a pallet 5 resting on it. The upper cart 9 and the station cart 8 can therefore be operated completely independently from each other, for example the station cart 8 as a supply cart and the upper cart 9 as a return cart, with the rack 1 not requiring any particular adjustments and yet allowing all rails to be mounted at the floor.

Figure 4:
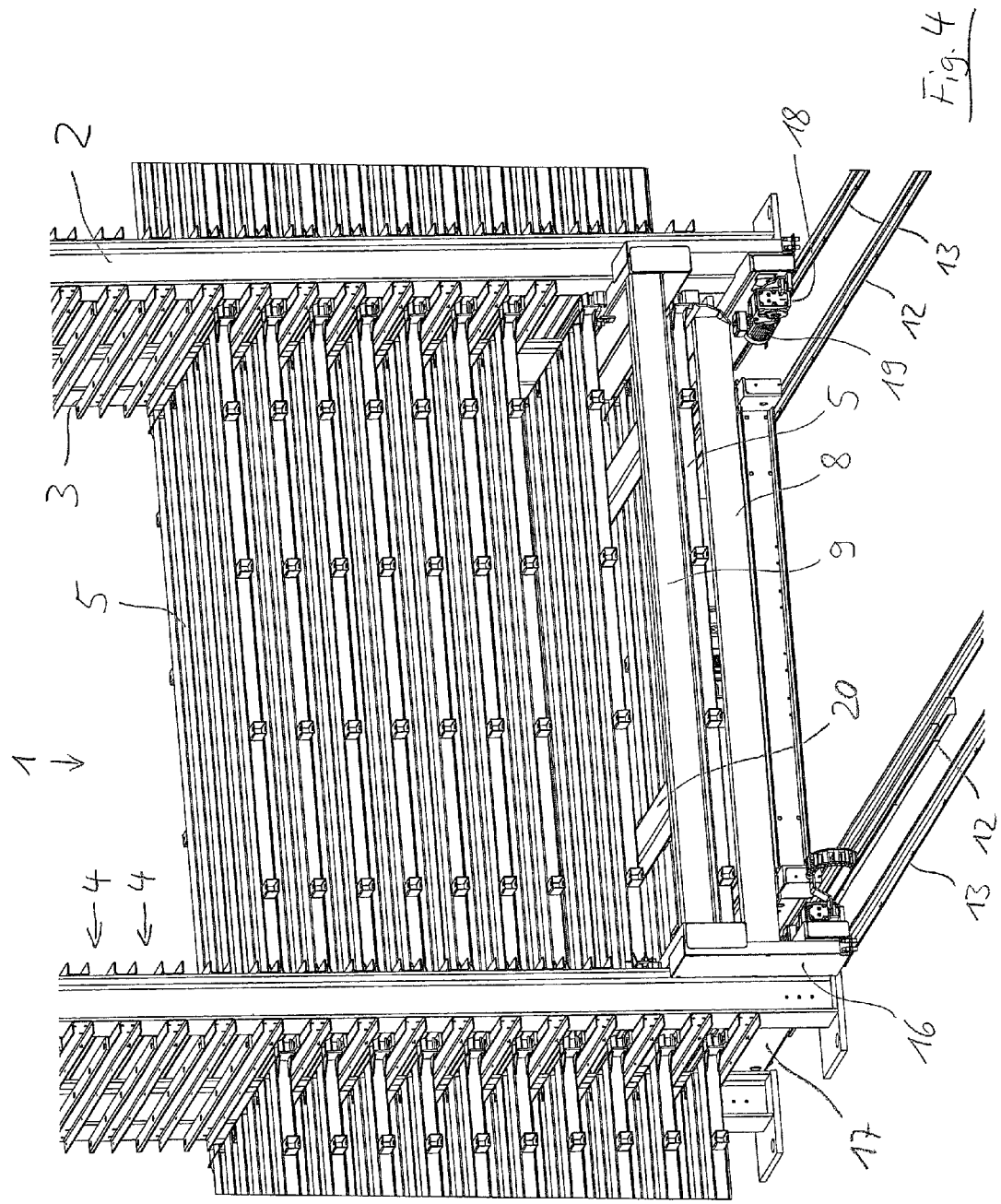
FIG. 4 is a perspective view of a part of the storage rack shown in FIG. 1.

FIG. 4 once more shows a perspective partial view of the rack 1 of FIG. 1, here more clearly showing the embodiment of the sliders 3 at the rack supports 2, at which the pallets 5 can be inserted for storage and removed, each of which forming a storage space 4. The upper cart 9, inserted into the rack 1, with its perpendicular traverse 15 and its supports 16 positioned in front of the rack supports 2 as well as its lower cantilevers 17, its upper cantilevers 20, and its wheels 18 driven by motors 19 running on two pairs of rails, is not supporting a pallet 5 here, while the station cart 8 arranged therebelow and running on the first pair of rails 12 carries a pallet 5. This illustrates that the pallet 5 together with the station cart 8 can be moved between the supports 16 of the upper cart 9, in spite of the second pair of rails 13, on which the upper cart 9 is running, having a track narrower than the length of a pallet 5 and thus allowing the second pair of rails 13 being mounted extending into the rack 1, between the rack supports 2.

Figure 5:
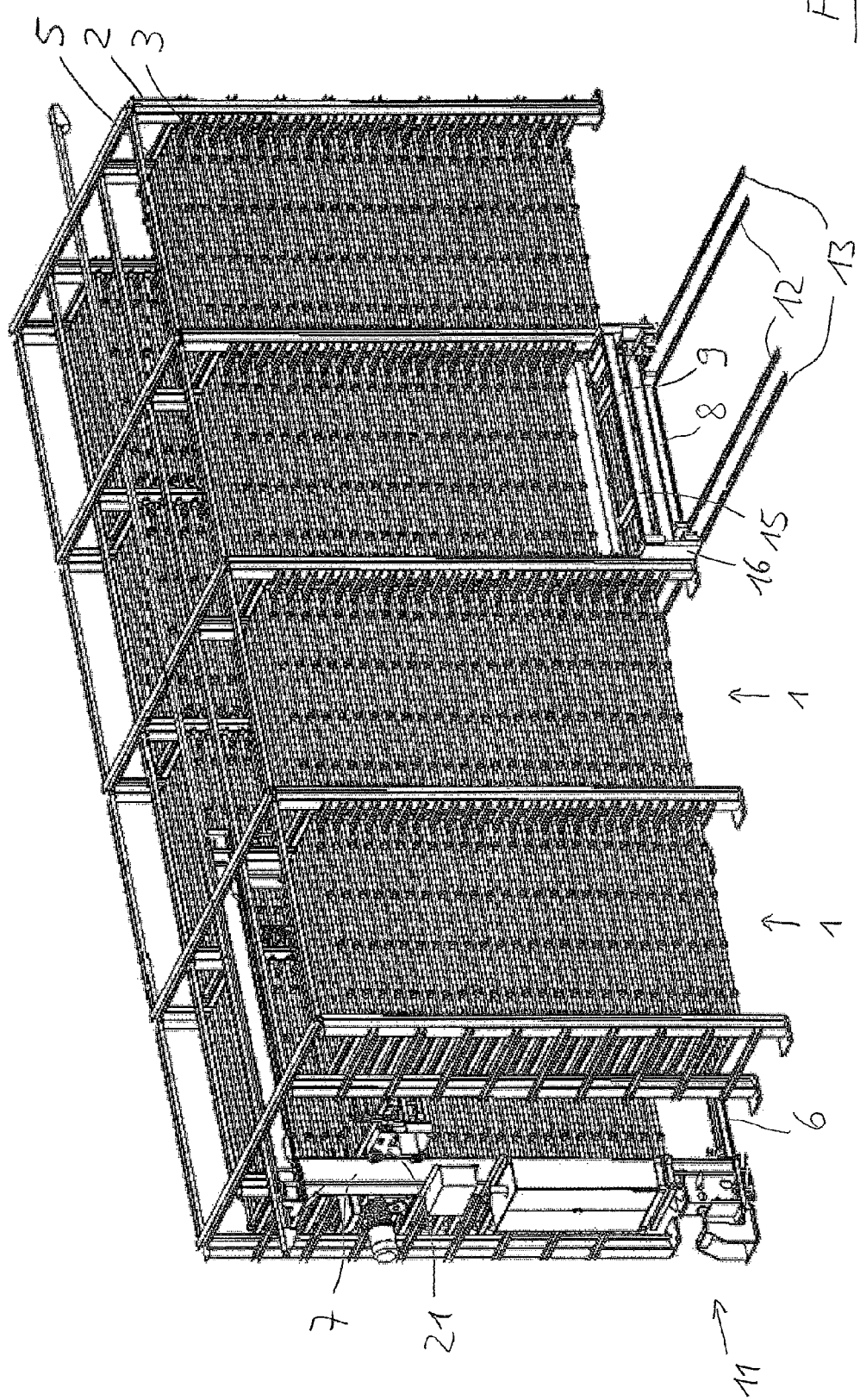
FIG. 5 is a perspective overall view of the storage rack.

Finally, FIG. 5 shows an overall perspective view of the present storage rack. It comprises a total of eight shelves 1, of which four shelves 1 each are arranged in front of and behind the rack alley 11. In the rack alley 11, the rack operating device 7 runs on the rail 6, provided with a traverser 21 and manipulators (not shown) to pull pallets 5 out of their storage spaces and/or to push them into said storage spaces. The second shelf 1, seen from the right in the rack row located in front of the rack alley 11, comprises the station cart 8 and the upper cart 9, which can be moved on the first pair of rails 12 and/or the second pair of rails 13 out of the storage rack, in order to supply individual pallets 5, fetched by the rack operating device 7 from their storage spaces and placed onto the station cart 8 or the upper cart 9 with the work pieces supported thereupon, to a processing machine (not shown) arranged in front of the storage rack and to return them therefrom to the storage rack. In the present illustration, both the station cart 8 as well as the upper cart 9 are inserted into the rack 1 and can therefore receive the respective pallets 5 from the rack operating device 7, with the support structure of the upper cart 9 formed by the perpendicular traverse 15 and the supports 16 projecting from the rack 1.

As particularly discernible in FIG. 5, the invention provides a solution for the problem stated at the outset, by which two carts, the upper cart 9 and the station cart 8, are displaceable independently in reference to each other, and can be moved out of the rack 1 on rails 12, 13 without any design changes of the rack 1, with the rails 12, 13 which can easily be crossed, and with free access being given to both carts 8, 9 for any type of loading or unloading units.

LIST OF REFERENCE CHARACTERS 1 rack
2 rack supports
3 sliders
4 storage spaces
5 pallets
6 driving rails
7 rack operating device
8 station cart
9 upper cart
10 circuit boards
11 rack alley
12 pair of rails (first)
13 pair of rails (second)
14 portal-shaped frame
15 perpendicular traverse
16 supports
17 cantilevers (lower)
18 wheels
19 motor
20 cantilevers (upper)
21 traverser

The invention claimed is:

1. A storage rack, comprising:
at least one shelf (1) with a number of storage spaces (4), arranged over top of each other, adapted to hold pallets (5) in the storage spaces (4) on vertical rack supports (2) arranged at a face thereof, with the pallets adapted to be horizontally removed sideways from the storage spaces (4), a rack operating device (7) for removing and inserting pallets (5) into and out of the storage spaces (4),
a station cart (8) forming a lowermost storage space (4) to receive a pallet (5),
a first pair of rails (12) extending out from a side of the rack (1) facing away from the rack operating device (7) on which the station cart (8) is horizontally moveable into and out from the rack (1),
an upper cart (9) located above the station cart (8) forming another one of the storage spaces (4) to receive a pallet (5),
a second pair of rails (13), which extends out of the rack (1) at the side of the rack (1) facing away from the rack operating device (7) on which the upper cart (9) is horizontally moveable into and out from the rack, the second pair of rails (13) generally extend at a same height as the first pair of rails (12), have a wider track, and also lead out of the rack (1),
the upper cart (9) comprising a support structure (15, 16) at a side facing away from the rack operating device (7), the support structure has a greater clearance in an area of the station cart (8) which is larger than a length of the pallet (5), and which is provided with wheels (18) running on the second pair of rails (13), and parts (17, 20) of the upper cart not related to the support structure (15, 16) are insertable between the vertical rack supports (2) of the rack (1), so that the upper cart (9) and the station cart (8) can be moved independently from one another into and out from the rack, and the upper cart (9) forms the storage space (4) located immediately above the station cart (8).

2. A storage rack according to claim 1, wherein the support structure of the upper cart (9) comprises a portal-shaped frame (14) with a perpendicular traverse (15) and two supports (16), with the wheels (18) being arranged at ends thereof.

3. A storage rack according to claim 2, wherein the wheels (18) of the upper cart (9) are arranged at the ends of the supports, spaced inwardly in reference to a clearance of the supports (16).

4. A storage rack according to claim 2, wherein the ends of the supports of the upper cart (9) are each provided with lower cantilevers (17), extending parallel in reference to the rails of the second pair of rails (13), and the wheels (18) are mounted to the lower cantilevers.

5. A storage rack according to claim 1, wherein the parts of the upper cart (9) related to the support structure essentially comprise at least two upper cantilevers (20) mounted to the support structure, that can be inserted between the vertical rack supports (2) of the rack (1).

6. A storage rack according to claim 5, wherein the at least two upper cantilevers (20) are provided, which support the pallets (5) at the end sections thereof and function as a storage space (4).

7. A storage rack according to claim 1, wherein the two pairs of rails (12, 13) are mounted to the floor of the rack site.

8. A storage rack according to claim 1, wherein the storage spaces (4) are provided with sliders or holding bars (3) mounted to the vertical rack supports (2) to receive the end faces of the pallets.

9. A storage rack according to claim 1, wherein the storage rack includes a plurality of shelves (1) arranged side-by-side and the rack operating device (7) is a common rack operating device (7), and uses at least a common one of the station carts (8) and a common one of the upper carts (9) each.

* * * * *